LIMITER CIRCUIT
Filed Aug. 31, 1955
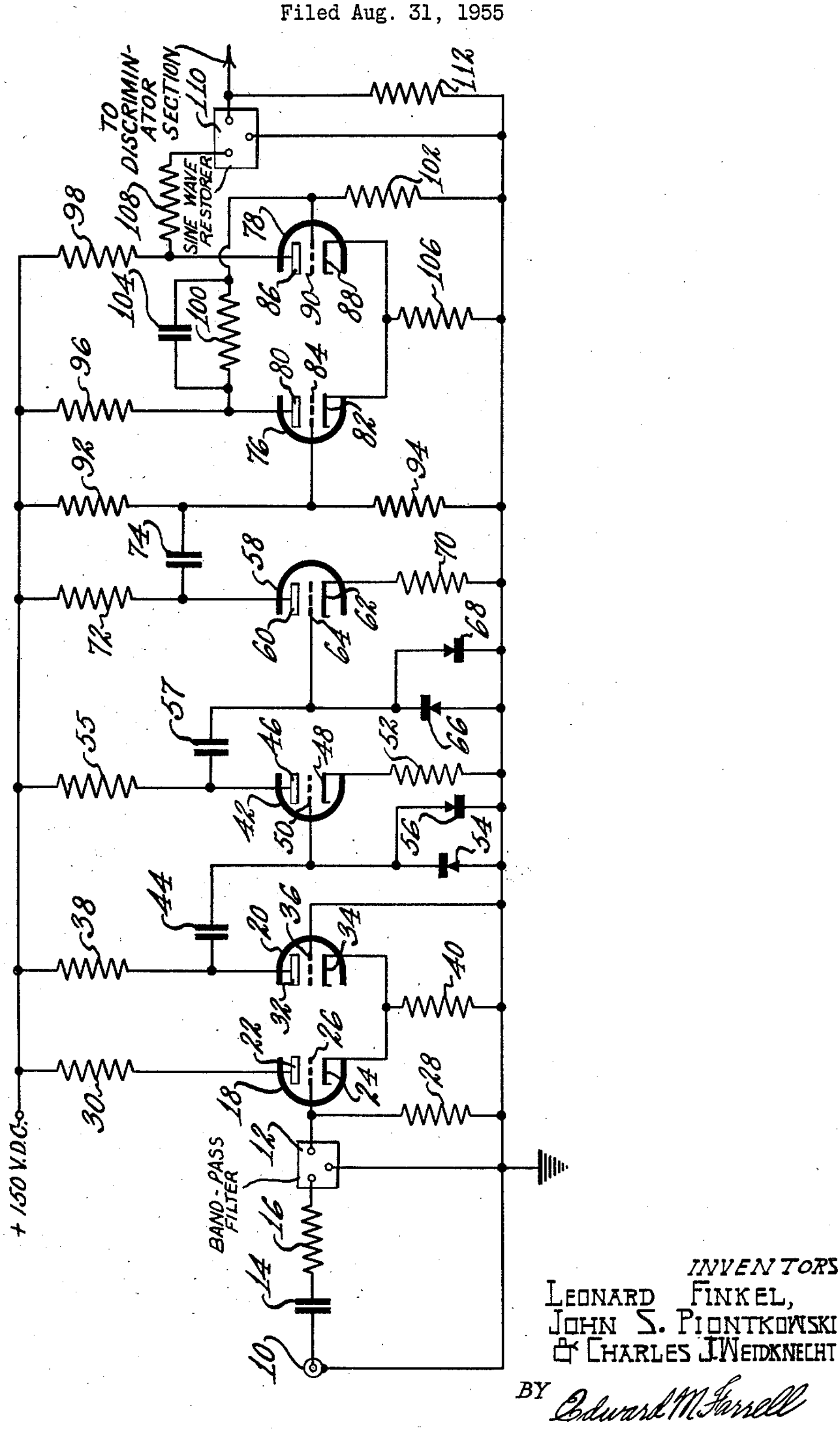
INVENTORS
LEONARD FINKEL,
JOHN S. PIONTKOWSKI
& CHARLES J. WEIDKNECHT
BY Edward M. Farrell
ATTORNEY United States Patent Office 2,821,629
Patented Jan. 28, 1958

2,821,629

LIMITER CIRCUIT

Leonard Finkel, Haddonfield, and John S. Piontkowski, Collingswood, N. J., and Charles J. Weidknecht, Philadelphia, Pa., assignors to Tele-Dynamics Inc., a corporation of Pennsylvania Application August 31, 1955, Serial No. 531,752

1 Claim. (Cl. 250—27)

This invention relates to limiter circuits, and more particularly to limiter circuits in connection with telemetric systems.

In many types of telemetric systems associated with guided missiles, pilotless aircrafts or projectiles, for example, recordations or measurements of acceleration, temperature, pressure, current and other variable quantities are often necessary. In such systems, a plurality of pickups is often used to convert the variable quantities into corresponding electrical signals which are used to frequency modulate a sub-carrier oscillator. The output voltages from the sub-carrier oscillators are combined by suitable circuit means and applied to a modulator circuit of a radio transmitter which, in turn, excites a transmitting antenna.

The transmitted signal is recovered by a receiver, which may be on the ground or at another remote point, which converts the transmitted signal into a composite sub-carrier voltage. Bandpass filters are then used to separate the individual sub-carrier voltages from the composite voltage. Each filtered sub-carrier voltage is then applied to an individual sub-carrier frequency discriminator which produces a varying direct current output voltage.

The direct current output voltage from each discriminator corresponds to a variable function at one of the pickups. The discriminator outputs may be recorded by suitable recording means for analysis at a later date or may be automatically converted into terms which will give an instantaneous indication of the value of the variable quantity.

In telemetric systems of the character described employing frequency modulation, exceptionally good elimination of amplitude modulation in the receiver is desirable. Limiters or amplitude leveling amplifiers commonly used in frequency modulation radio receivers do not always provide the distortionless output necessary in telemetering and other measuring systems.

Heretofore, amplifiers have been often used to perform limiting functions to remove amplitude modulation from frequency modulated signals. Such limiting has been done by restricting the top and bottom halves of an incoming wave. When such amplifiers are used, the wave form of the output signals is very often unsymmetrical. The lack of symmetry may be caused by numerous factors, such as stray capacitances or dissymmetries in the circuit associated with the amplifier. Such lack of symmetry may also be produced by variations in plate or filament voltages, which change the operating point of the amplifier.

In some cases, the dissymmetry of a limiter amplifier may be overcome to some extent through the use of filter circuits or sine wave restorers. Such circuits, especially when multiple limiter stages are necessary, are relatively complex and expensive. In telemetering systems, as well as other systems, such additional complexity and expense are undesirable.

Eighteen sub-carrier oscillators are provided in many standard telemetering systems. A single receiver at the receiving station is generally used in such systems and supply an output electrical signal to the eighteen band pass filters and their associated limiter circuits. In many limiter amplifiers, part of the limiting function is performed by driving the amplifiers to saturation. This often produces grid current in the input circuit when electron discharge devices are employed as the amplifier devices. Such grid current lowers the input impedance to the amplifier thereby heavily loading the preceding circuit.

In limiter circuits wherein grid current is produced in the input circuit, the input impedance will be governed to a great extent by the strength of the incoming signals. A potentiometer or other control means must generally be employed to limit the amplitude of the incoming signal to a predetermined value. Such control means in telemetering systems is often inconvenient for the operator. Also, a limiter circuit requiring such control means is not readily adaptable to more than one type of telemetering system since the amplitude of input signals may vary over a wide range for different systems.

Some limiter circuits used heretofore have included vacuum tube diodes to produce a limiting action. The use of such diodes necessitates filament power as well as additional components, such as biasing resistors. In telemetering equipment, especially where the receiver is airborne, it is desirable to minimize the number of parts employed thereby reducing the weight and space of such equipment. It is also desirable to eliminate the necessity of filament power thereby minimizing the temperature conditions which may affect the operation of the system.

It is an object of this invention to provide an improved limiter circuit wherein exceptionally good elimination of amplitude modulation is obtained.

It is a further object of this invention to provide an improved limiter circuit which provides a symmetrical wave form to a subsequent discriminator circuit.

It is still a further object of this invention to provide an improved limiter circuit wherein a symmetrical waveform is applied to a subsequent discriminator stage despite variations of plate and filament voltages of associated electron discharge devices.

It is still a further object of this invention to provide an improved limiter circuit which may be used without adjustment in different systems wherein the input signals may vary over wide amplitudes.

It is still a further object of this invention to provide a novel diode limiter which does not require filament power or biasing resistors.

In accordance with the present invention, an electrical signal from a bandpass filter is applied to a cathode clipper amplifier having relatively constant input impedance for signals of different amplitudes. The output from the cathode clipper amplifier is applied to a limiter amplifier which has a linear operating range. A pair of parallel semi-conductor diodes are connected with their polarities reversed in the input circuit of the limiter amplifier. The diodes have a characteristic of being substantially normally non-conductive and of being conductive upon the application of a voltage in excess of a predetermined amplitude. The output from the limiter amplifier is applied to a bistable circuit which provides a relatively square wave output voltage. The square wave voltage may be applied to a sine wave restorer or other utilization circuit before being applied to a discriminator circuit.

Other objects and advantages of the present invention will be apparent and suggest themselves to those skilled in the art from a reading of the following specification in association with the accompanying drawing which shows a preferred embodiment of this invention.

Referring to the drawing, a complex signal from a low impedance receiver output may be applied to an input jack 10 having its outer conductor connected to a point of reference potential, designated as ground. The complex signal is applied to a band-pass channel separation filter indicated by a block 12 through a capacitor 14 and a resistor 16.

The voltage output from the channel separation filter 12, which may be in the form of a sine wave, is applied to a cathode coupled clipper amplifier comprising a pair of electron discharge devices 18 and 20. The device 18 includes an anode 22, a cathode 24 and a control grid 26. A grid leak resistor 28 is connected between the control grid 26 and ground. The anode 22 is connected to a source of operating potential, designated +150 v. D. C. through a resistor 30. The device 20 includes an anode 32, a cathode 34 and a control grid 36. The anode 32 is conneced to the source of operating potential through a resistor 38. A common cathode resistor 40 is connected between the cathode 24, 34 and ground.

The output from the cathode clipper amplifier circuit, which may be a sine wave or a sine wave having clipped positive and negative halves, is coupled to a first limiter amplifier circuit including an electron discharge device 42 through a coupling capacitor 44. The device 42 comprises an anode 46, a cathode 48, and a control grid 50. A biasing resistor 52 is connected between the cathode 48 and ground. A pair of parallel semi-conductor diodes 54 and 56 are connected with their polarities reversed in the input circuit of the limiter amplifier between the control grid 50 and ground. The anode 46 is connected to the source of operating potential through a resistor 55.

The voltage output from the device 42, which may be close to the shape of a square wave, is coupled through a coupling capacitor 57 to a second limiter amplifier circuit comprising an electron discharge device 58. The second limiter amplifier circuit is substantially similar to the first limiter amplifier circuit. The device 58 comprises an anode 60, a cathode 62 and a control grid 64. A pair of parallel semi-conductor diodes 66 and 68 is connected between the control grid 64 and ground. The anode 60 is connected to the source of operating potential through a resistor 72.

The second limiter circuit is connected to a bistable circuit through a coupling capacitor 74. The voltage output from the second limiter may be substantially in the form of a square wave. The bistable circuit comprises a pair of electron discharge devices 76 and 78. The device 76 comprises an anode 80, a cathode 82 and a control grid 84 and the device 78 comprises an anode 86, a cathode 88 and a control grid 90. A form of voltage divider network is provided by resistors 92 and 94 connected across the +150 v. D. C. source. The control grid 84 is connected to a point intermediate the resistors 92 and 94. The anodes 80 and 86 are connected to the source of operating potential through resistors 96 and 98, respectively. A second form of voltage divider network is provided by the resistor 96 and resistors 100 and 102. A capacitor 104 shunts the resistor 100. The control grid 90 is connected to a point intermediate the resistors 100 and 102. A common cathode coupling resistor 106 is connected between the cathodes 82, 88 and ground.

The voltage output from the bistable circuit, which is substantially a square wave in shape, is applied through a resistor 108 to a filter network or sine wave restorer, designated by a block 110. The output voltage from the sine wave restorer is then applied across a resistor 112. The voltage developed across the resistor 112 may be applied to a discriminator section of a radio receiver or other utilization circuit.

In considering the operation of the circuit in connection with a standard telemetering system, the input jack 10 may be connected to a receiver having a composite output signal comprising a plurality of sub-carrier signals. The bandpass filter 12 is provided to separate one of the sub-carrier signals from the composite signal. The output voltage from the bandpass filter may offer a relatively high impedance to the output circuit of a receiver connected to the jack 10. The use of a high impedance filter permits the receiver signal to be used directly without auxiliary amplification of the complex composite output signal with the attendant cross-talk problems.

When the control grid 26 of the device 18 is made positive, the current through the resistor 40 is increased so that the cathodes 24 and 34 become more positive with respect to ground. Making the cathode 34 more positive with respect to ground is equivalent to making the control grid 36 more negative. Thus a positive change at the control grid 26 effects a resultant negative change at the control grid 36. This phase reversal causes the electron device 20 to effect negative grid limiting for the positive half cycles of applied sine wave from the bandpass filter 12. The electron discharge device 18 effects grid limiting for the negative half cycles. Thus when the control grid 26 is made negative, negative grid cut-off limits the change in cathode current caused by the input signal to the cathode clipper. When the control grid 26 is made positive, the control grid 36 is effectively made negative until negative cut-off is reached for the electron discharge device 20.

It is seen that the cathode clipper circuit shown does not draw grid current during any portion of the incoming signal, but functions alternately cutting off the devices 18 and 20. Consequently, a relatively constant input impedance to the bandpass filter 12 is provided regardless of signal level. This arrangement is one of the features of the present invention which permits the limiter circuit to be used in different types of telemetering systems having input signals of widely varying amplitudes.

The voltage output from the cathode clipper, which is substantially in the form of a clipped sine wave is applied to the limiter amplifier comprising the electron discharge device 42. This amplifier is designed and biased to operate in a linear manner so that its signal voltage output at its anode 46 is of substantially the same form as its input signal voltage at the control grid 50. The linearity of the amplifier is maintained provided the voltage input to the control grid 50 is not sufficient to drive the device 42 beyond its linear operating characteristic. In order to assure that the input voltage to the control grid 50 does not exceed a certain value and does not drive the device 42 beyond its linear operating condition, the pair of diodes 54 and 56 is provided in the grid cathode circuit of the device 42.

The diodes 54 and 56 are connected in parallel relationship to each other with their polarities connected in reverse, i. e. an input signal of a positive polarity will cause conduction in one of the diodes whereas an input signal of a negative polarity will cause conduction in the other diode. In a preferred form of the invention, the voltage drop peculiar to the forward conduction characteristic of the diodes is used to limit the peak to peak excursion of the signal applied to the control grid 50 to approximately 1.2 volts. This restricts the operation of the device 42 to its linear amplification region. If the voltage at the anode 46 or the filament supply voltage (the source of which is not shown) varies, the effect on the operation of the circuit will be minimized. This is true since such a variation in anode and filament voltage will merely shift the point of operation of the device 42. Even with slight shifts in the points of operation of the device 42, the circuit may be designed so that the point of operation for the entire cycle of the input signal, limited by the diodes 54 and 56, will still be on the linear portion of the characteristic curve of the device 42.

The characteristics of the crystal diodes 54 and 56, which may comprise germanium, silicon or other suitable material, are normally substantially non-conductive until a voltage of a predetermined amplitude is reached at which point they become conductive. In some cases, a slight current may flow in the diodes even with extremely low signals. However, for practical operation, this small current may be considered as non-existant. Consequently the voltage applied to the control grid 50 is clipped or limited at the predetermined amplitude which is a relatively low value. Regardless of the strength of the signal voltage from the anode 32 of the device 20, the voltage applied to the control grid 50 will be substantially the same due to the clipping action of the diodes. The use of diodes 54 and 56 eliminates the necessity of filament voltage or of biasing resistors, such as are found in some limiter circuits used heretofore.

The output voltage from the device 42 is applied to the control grid 64 of the second limiter amplifier, which includes the electron discharge device 58. The operation of the circuit associated with the device 58 is substantially the same as the first limiter amplifier including the device 42. The diodes 66 and 68 are similar to the diodes 54 and 56 and are used to prevent overdriving the device 58.

In operation, it was noted that the use of a pair of diodes connected in parallel with their polarities reversed provides a good limiting action. However, since some crystal diodes become unstable under a range of temperature, additional limiting action was utilized in the present circuit. Increasing the number of limiter stages will often increase the effectiveness of the circuit. In the present circuit, two limiter amplifier stages are used prior to the application of the signal to a form of bistable network comprising the devices 76 and 78.

The bistable network provides two stable states of operation. The stable state at which the network operates is determined by the instantaneous potential at the control grid 84.

In considering the operation of this circuit, first assume that a positive potential is applied to the control grid 84 to increase the current in the device 76. The voltage at the anode 80 decreases causing the potential at the control grid 90 to decrease. The current in the device 78 decreases causing the voltage drop across the resistor 106 to decrease. The decreased voltage drop across the resistor 106 is equivalent to increasing the voltage at the control grid 84 causing a still further increase in current in the device 76. This action is cumulative and almost instantaneously the device 76 is driven to saturation and the device 78 is driven to cut-off.

When a negative potential is applied to the control grid 84, the current in the device 76 decreases. The voltage at the anode 80 increases causing the potential at the control grid 90 to increase. The current in the device 78 increases causing the voltage drop across the resistor 106 to increase. The increased voltage drop across the resistor 106 is equivalent to decreasing the voltage at the control grid 84 causing a still further decrease in current in the device 76. Again this action is cumulative and almost instantaneously the device 76 is cut off and the device 78 reaches saturation.

It is seen that the output voltage at the anode 86 will be either a relatively high value or a relatively low value dependent upon the voltage input to the control grid 84. The voltage at the anode 86 will be in the form of a square wave when an alternating signal voltage is applied to the control grid 84.

The bistable network shown is designed to operate at a point in between the two stable states when no input signal is applied to the control grid 84. Under these conditions, the application of a signal voltage of one polarity will cause the voltage at the anode 86 to shift to one stable state while the application of a signal voltage of the opposite polarity will cause the voltage at the anode 86 to shift to the second stable state of operation. Application of an alternating signal to the control grid 84 produces a shifting of the voltage at the anode 86 from one stable state to the other thereby providing a square wave output voltage.

In order to have the bistable network normally operative at a point between the two stable states, the values of the resistors must be properly chosen to provide grid bias for the devices 76 and 78. A positive potential with respect to ground is applied to the control grid 84 from a form of voltage divider comprising resistors 92 and 94. Likewise a positive potential with respect to ground is applied to the control grid 90 from a form of voltage divider comprising the resistors 96, 100 and 102. The value of the resistor 106 must also be properly chosen to attain the desired operating point for the bistable network.

The output voltage from the bistable network is substantially a square wave and is applied to the sine wave restorer 110. The output signal from the sine wave restorer, which is of substantially the same frequency as the information signal originating at one of the oscillators associated with one of the pick-ups at the transmitting end of the telemetering system, may then be applied to the discriminator section of the receiver. The discriminator circuit converts the sine wave signal into a corresponding D. C. voltage which is utilized to determine the actual value of the measured function, such as the speed, temperature, etc. associated with a guided missile or the like.

The output signal applied to the discriminator from the limiter circuit embodying the present invention is not only symmetrical in form, but is substantially free of amplitude modulation. The improved limiter circuit shown may be used with different types of telemetering systems involving wide variations in the amplitude of the input signals with no manual adjustment being necessary. Space and temperature requirements are minimized through the use of the limiter circuit shown and described.

What is claimed is:

A limiter circuit comprising a band pass filter, means for applying a complex electrical signal from a receiver to said band pass filter, a cathode coupled clipper amplifier, means for applying the electrical output signals from said band pass filter to said cathode coupled clipper amplifier, a limiter amplifier having input and output circuits, a pair of parallel semi-conductor diodes connected with their polarities reversed in said input circuit of said limiter amplifier, said diodes being normally substantially non-conductive and being relatively highly conductive upon the application of a voltage of a predetermined amplitude, means for applying the output signals from said clipper amplifier to said input circuit of said limiter amplifier, a bistable circuit having two relatively stable operating states, means for operating said bistable circuit at a point intermediate said two relatively stable operating states, means for applying the output signals from said limiter amplifier to said bistable circuit to provide a square wave voltage, a sine wave restorer, means for applying said square wave voltage to said sine wave restorer, and means for applying the output voltage from said sine wave restorer to a discriminator circuit.

References Cited in the file of this patent

UNITED STATES PATENTS

| | | |
|---|---|---|
| 1,200,796 | Arnold | Oct. 10, 1916 |
| 2,276,565 | Crosby | Mar. 17, 1942 |
| 2,401,404 | Bedford | June 4, 1946 |
| 2,441,957 | De Rosa | May 25, 1948 |
| 2,552,348 | Shapiro | May 8, 1951 |
| 2,731,571 | Chance | Jan. 17, 1956 |